OPTICAL FACSIMILE SCANNING SYSTEM

Filed June 28, 1967 3 Sheets-Sheet 1

INVENTORS
Glenn A. Reese
Gustavus B. Pearson
By Smyth, Roston & Pavitt
Attorneys Oct. 28, 1969 G. A. REESE ET AL 3,475,553

OPTICAL FACSIMILE SCANNING SYSTEM

Filed June 28, 1967 3 Sheets-Sheet 2

INVENTORS:
Glenn A. Reese
Gustavus B. Pearson
By Smyth, Roston & Pavitt
Attorneys

OPTICAL FACSIMILE SCANNING SYSTEM

Filed June 28, 1967 3 Sheets-Sheet 3

INVENTORS
Glenn A. Reese
Gustavus B. Pearson
By Smyth, Roston & Pavitt
ATTORNEYS 3,475,553

OPTICAL FACSIMILE SCANNING SYSTEM

Glenn A. Reese, San Pedro, and Gustavus B. Pearson, Playa Del Rey, Calif., assignors to The Magnavox Company, Torrance, Calif., a corporation of Delaware Continuation-in-part of application Ser. No. 436,504, Mar. 2, 1965. This application June 28, 1967, Ser. No. 655,261
Int. Cl. H04n 3/28
U.S. Cl. 178—7.6 11 Claims

ABSTRACT OF THE DISCLOSURE

A facsimile unit with a cylindrical document support, two oppositely oriented rotating scanning spots for operation as a facsimile transmitter, an optical system to guide the reflection essentially into an axial path and including an aperture disk, a filter, a light chopper and a photodetector. The rotating scanner supports also a printer for operation of the unit as facsimile receiver.

The present invention is a continuation-in-part application of application Serial No. 436,504 (now abandoned) filed Mar. 2, 1965, and relates to facsimile systems and more particularly to a pickup transducer and related optical system for scanning a document which is to be reproduced and generating signals corresponding to the contents of the document.

At the present time, there are a large number of facsimile systems capable of scanning an original document and transmitting signals over a considerable distance for producing a facsimile of the original document. In order for such facsimile system to make a faithful facsimile, the pickup transducers for scanning the original document must provide a baseband facsimile signal that is an accurate function of the contents of the document. Although numerous forms of pickup transducers have been proposed, they are normally of a photo-electric variety responsive to the amount of light reflected from the document. A facsimile system of this variety is disclosed and claimed in copending application Ser. No. 669,315 filed Sept. 20, 1967, on behalf of Glenn A. Reese and Paul J. Crane entitled "Facsimile Systems," which in turn is a continuation of application Ser. No. 549,759 (now abandoned) filed Apr 21, 1966, and entitled "Facsimile Systems," which in turn is a continuation of application Ser. No. 176,248 (now abandoned) filed Feb. 28, 1962, and entitled "Facsimile Systems" and assigned of record to The Magnavox Company.

This system employs a transceiver capable of operating in either a transmit mode or a receive mode. When the transceiver is operating in the transmit mode, a lamp illuminates the surface of the document and the reflected light is focused onto a photoelectric cell by lens means that scan across the document. The photo-electric cell responds to the reflected light and produces a baseband signal proportional to the reflectivity of the document being scanned.

Such an arrangement is effective to provide a satisfactory baseband signal. However, it has been found that it is difficult to provide a strong baseband signal without employing a very sensitive and expensive photo-electric cell such as a photo-multiplier tube. When reproducing some types of documents such as a letter, drawing, etc., there are large portions of the baseband signal that have very low frequencies. As a consequence, it is very difficult to amplify a low amplitude baseband signal without producing a large amount of noise and/or drift.

In order to facilitate the scanning of the document, it is desirable for the optical system to have two separate branches that alternately scan the successive lines of the document. Although such an arrangement can operate effectively, it has been found extremely difficult to produce a consistent baseband signal which remains the same function of the document irrespective of which branch of the optical system is scanning the document.

If the baseband signal is not adequately and faithfully amplified and/or there are dissimilarities between the branches of the optical system, there will be irregularities in the facsimile which will degrade the quality of the facsimile. It will thus be seen that although the foregoing system has been satisfactory for accomplishing the desired objectives, it does not have certain limitations and disadvantages.

The present invention provides a facsimile system which overcomes the foregoing difficulties, disadvantages and limitations. More particularly, the present invention provides a facsimile system having pickup transducer means which is not only inexpensive and reliable, but also produces a baseband signal that is an accurate function of the character of the document. The pickup transducer means includes an optical system having two branches that are constructed and arranged to insure baseband signals that are consistently uniform irrespective of which portion of the optical system is scanning the document. In addition, the pickup transducer means provides a baseband signal which is free of noise and is capable of being easily amplified to a much higher amplitude without producing a drift distortion or noise.

In one operative embodiment of the present invention, the pickup transducer means are mounted on a rotating yoke disposed adjacent the document to be reproduced. A lamp is mounted on the axis of rotation of the yoke and a pair of parabolic mirrors carried by the yoke concentrate the light from the mirrors into two bright spots that successively travel across the surface of a document as the yoke rotates. An optical system is provided for concentrating the light reflected from the bright spots onto an inexpensive photo-electric cell which produces an electrical signal proportional to the amplitude of the light reflected from the document.

The optical system includes further a filter cooperating with the lamp to establish peak light intensity values in the yellow region dropping off for blue and red light. This way colored lines (except yellow lines which are very rarely used) are seen "black" by the system.

A shutter wheel or light chopper is disposed in front of the photo-electric cell so as to periodically mechanically disrupt the light reaching the photo-electric cell. As a consequence, even though the variations in the intensity of the reflected light are very slow, the signal from the photo-electric cell will be an alternating signal having a sufficiently high frequency to insure a faithful amplification by an AC amplifier.

These and other features and advantages of the present invention will become readily apparent from the following detailed description of a single embodiment thereof particularly when taken in connection with the accompanying drawings wherein like reference numerals refer to like parts and wherein.

Figure 5A:
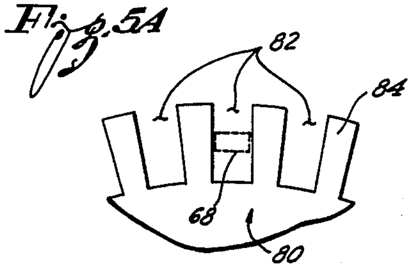
Figure 5B:
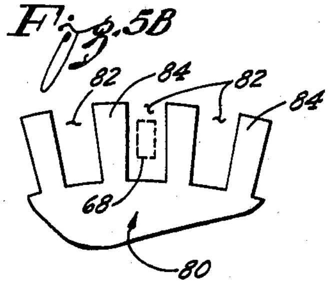
Figure 6A:
Figure 6B:
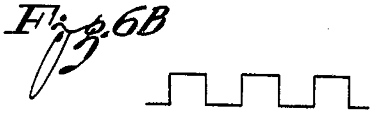
Figure 6C:
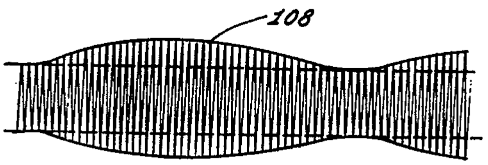
Figure 3:
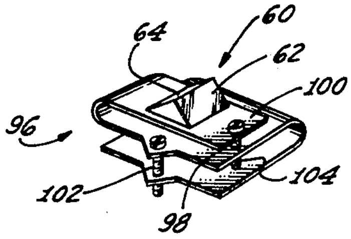
FIGURE 3 is a perspective view of a reflecting prism included in the embodiment shown in FIGURES 1 and 2 and of means for adjusting the position of the reflecting prism.
Figure 7:
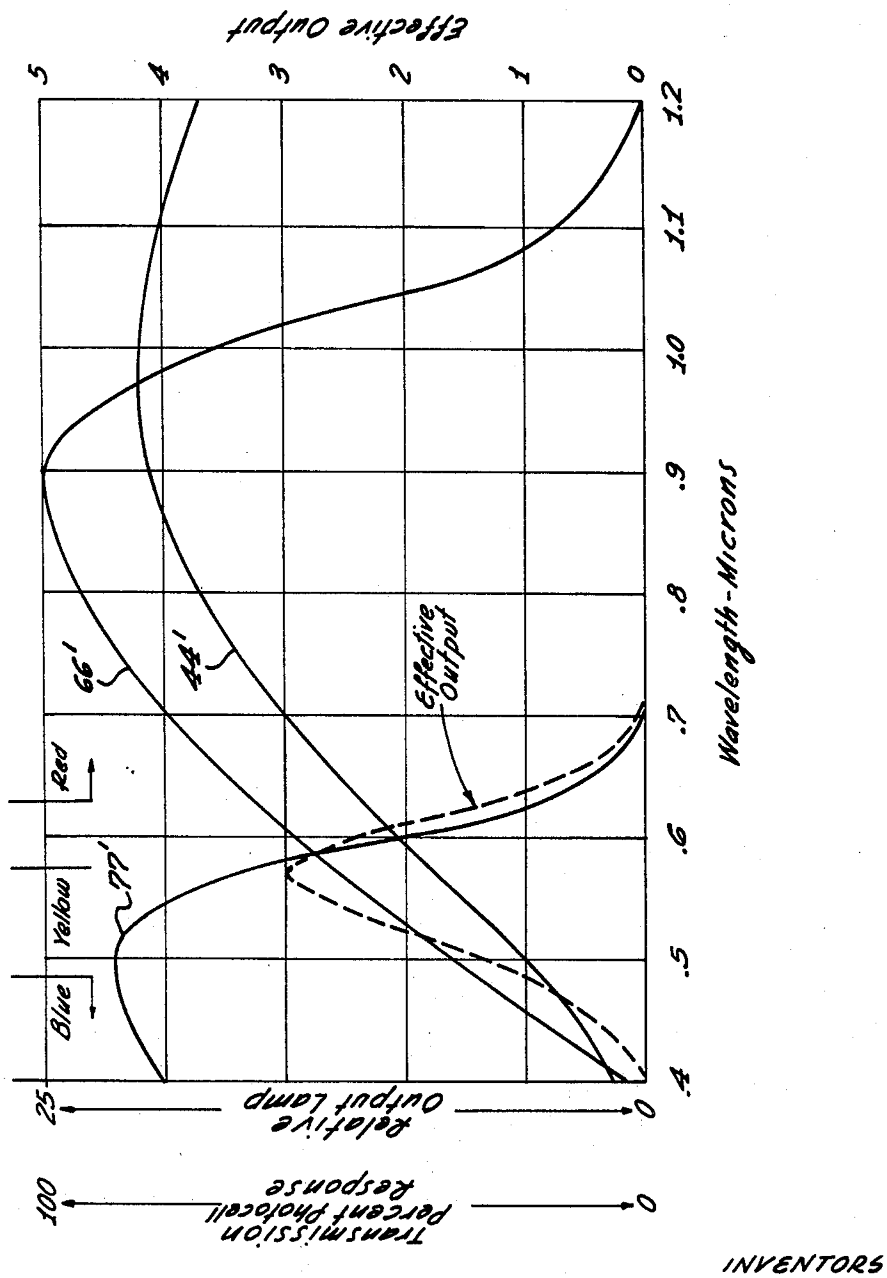

FIGURES 5*a* and 5*b* are views, on a greatly enlarged scale, of segments of a shutter wheel employed in the optical portion of the transducer means, during two sets of operating conditions;

FIGURES 6*a*, 6*b* and 6*c* are views of waveforms produced in different portions of the transducer means during different operating conditions; and FIGURE 7 shows graphs of representative examples for the response curve of the photo-detector in the transducer, the output characteristics of the light source, the transmision characteristics of the filter in the optical path of the transducer, and the resulting effective input for the transducer.

Referring to the drawings in more detail, the present invention is particularly adapted to be embodied in pickup transducer means 10 to be used in a receiver 12 for a facsimile system. Although the transceiver 12 may be of any desired variety, in the present instance, it is substantially identical to the transceiver disclosed and claimed in copending application, Ser. No. 494,053 filed Oct. 8, 1965, in the names of Glenn A. Reese and Gustavus B. Pearson and in the above-cited Ser. No. 669,315 and assigned of record to The Magnavox Company.

The present transducer 12 is adapted to operate in either a transmit mode or a receive mode. When the transceiver 12 is operating in the transmit mode, it is effective to scan the original document to be duplicated and produce and transmit signals corresponding to the character of the document. When the transceiver 12 is operating in a receive mode, it is effective to scan a blank copy paper and to print on the copy paper in response to the signals representing the original document whereby a facsimile of the document will be produced on the copy paper.

The various operative elements of the transceiver 12 are mounted upon a base 14 that supports the transceiver 12. A platen 16 extends horizontally across the base 14 for receiving the original document and/or the blank copy paper and to retain them in position.

A cradle 18 having a pair of parallel sides 20 and cross members 22 is mounted on the end of an arm 26 attached to the base 14 by a hinge 24. The hinge 24 permits the arm 26 to carry the cradle 18 into an operative position adjacent the platen 16 and a service position remote therefrom. One end of the cradle 18 is supported by a paper release 28 that includes a control lever 30. When the lever 30 is moved to one extreme position, the cradle 18 will be moved away from the platen 16 a sufficient distance to permit the document and/or the copy paper to be placed on the platen 16. However, when the lever 30 is moved to the other extreme position, the cradle 18 will advance towards the platen 16 to retain the document and/or copy paper on the platen 16.

Although the platen 16 may be fabricated by an suitable means, in the present instance, it is a sheet metal stamping having a substantially cylindrical inner surface 40 which will be effective to maintain the document or copy paper in a similar cylindrical shape. The surface 40 is preferably smooth so that the document and/or copy paper may be advanced axially therealong by a paper drive after the cradle 18 has been advanced against the platen 16 by the paper release 28.

The cradle 18 carries a drive motor 32, a rotating yoke 34, a synchronizing clutch 36 that connects the yoke 34 to the motor 32 and pickup and printing transducer means 10 and 38 which are mounted on the yoke 34 and rotate therewith for scanning the document and/or copy paper positioned on the platen 16.

The drive motor 32 is preferably of the so-called synchronous type that will only run at a synchronous speed precisely related to only the frequency of the power supplied thereto. Thus, if the motors 32 in a transmitting or receiving unit are energized by power of the identical frequencies, the two motors 32 will run at identical speeds and the pickup and printing transducers 10 and 38 will be driven at precisely identical speeds and in synchronism with each other.

The synchronizing clutch 36 connects the drive motor 32 to the yoke 34 whereby the yoke 34 will be rotatably driven. Although this clutch 36 may be of any desired variety, in the present instance, it is substantially identical to the clutch disclosed and claimed in copending application, Ser. No. 520,269, filed Jan. 12, 1966 in the names of Glenn A. Reese and Paul J. Crane and assigned of record to The Magnavox Company. This clutch 36 includes first and second drive paths which will cause the yoke 34 to rotate at a synchronous speed or to rotate at a slightly slower speed. Prior to the actual transmission and reception of the facsimile signals, the transmitting and receiving units initially pass through a synchronizing phase. During this phase, the first drive path is operative in the transmitting unit to cause its yoke 34 to run at synchronous speed. However, the second drive is operative in the receiving unit to drive that yoke 34 at a slightly slower speed. As a result, the phase of the printing transducers 38 in the receiving unit will slowly retrogress relative to the phase of the pickup transducers 10 in the transmitting unit. When the phase of the printing transducers 38 exactly matches phase of the pickup transducers 10, the receiving clutch switches to the first drive path so that the printing transducers 38 will then rotate at the same synchronous speed as the pickup transducers 10 and will be phase-locked therewith.

The yoke 34 has one end connected directly to the clutch 36 while the opposite end of the yoke 34 includes a cross arm 42 which may act as a turntable for carrying the pickup transducers 10 and the printing transducers 38. An extension of the cross arm 42 extends through the end of the cradle 18 and is supported by a bearing.

It should be noted that any desired number and type of pickup and printing transducer means 10 and 38 may be employed. However, in the present instance, there are a pair of pickup transducers 10 and a pair of printing transducers 38 for scanning the material on the platen 16. The transducers in each of the pairs are diametrically aligned with each other and are at right angles to the transducers in the other pair. By arranging the transducers in pairs, the platen 16 may subtend on arc on the order of 180° or slightly less, but the backstroke between the successive scans will remain very short.

Although any desired type of printing transducers 38 may be employed, in the present instance, the printing transducers 38 are identical to those disclosed and claimed in United States Patent No. 3,325,821 issued June 13, 1967, in the names of Glenn A. Reese and Donald H. Westermeir and assigned of record to The Magnavox Company. More particularly, the printing transducers 38 include a stylus which is effective to ride across the surface of the copy paper mounted on the platen 16. An armature in the transducer 38 produces a force on the stylus proportional to the magnitude of the baseband signal. Pressure-sensitive writing material such as a sheet of carbon paper overlies the blank copy paper whereby the force produced by the stylus will be effective to cause the pressure-sensitive writing material on the carbon paper to print directly onto the blank copy paper.

Figure 1:
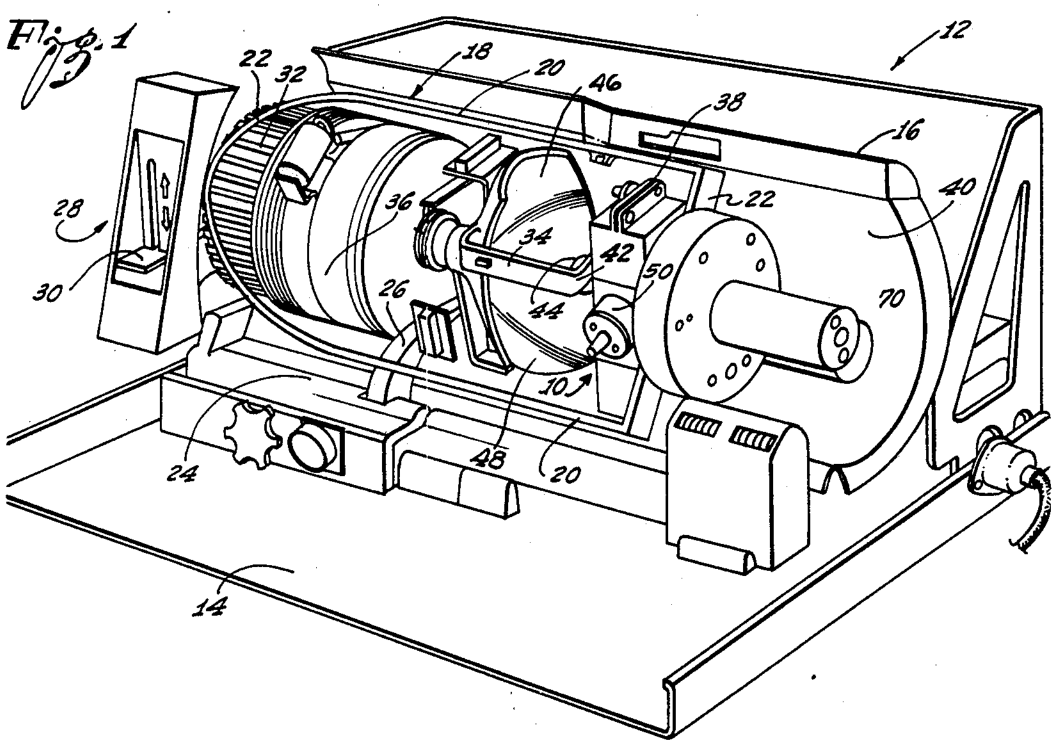
FIGURE 1 is a perspective view of a facsimile transceiver employing pickup transducer means embodying one form of the present invention.
Figure 2:
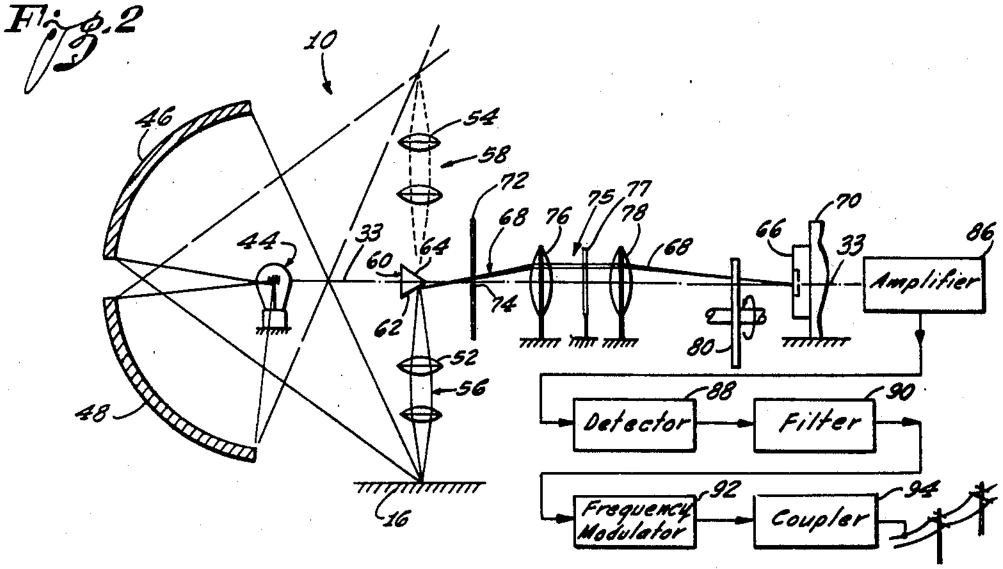
FIGURE 2 is a combination schematic and block diagram of the pickup transducer means employed in the transceiver of FIGURE 1.

The pickup transducer means 10, as best seen in FIGURE 2, include an incandescent lamp 44 for illuminating the surface of a document mounted upon the platen 16. Lamp 44 may have an output intensity vs. wavelength characteristics shown as curve 44' in FIGURE 7. The lamp 44 is preferably positioned with the filament disposed on the axis of rotation 33. The light from the lamp 44 may be focused or otherwise concentrated into a pair of bright spots. In the present instance, this is accomplished by means of a pair of semi-parabolic reflector mirrors 46 and 48 mounted upon the yoke 34. As the yoke 34 rotates, it will revolve around the filament in the lamp 44 and the parabolic mirrors 46 and 48 will produce symmetrical bright spots which are very precisely positioned immediately adjacent the area swept by the yoke 34. This will cause the bright spots to successively scan across the surface of the document. These bright spots will continuously scan across an identical line relative to the platen 16. However, if the document is advanced axially along the platen 16, the bright spots will progressively scan the entire document.

A pair of housings 50 are mounted on the diametrically opposite sides of the yoke 34 so as to rotate therewith. Each of these housings 50 includes a lens system 52 or 54 which is focused on the document. The fields of view of the lenses 52 and 54 are concentrated in the center of the bright spot produced on the surface of the document by the lamp 44 and reflecting mirrors 46 and 48. It will thus be seen that as the yoke 34 rotates the first mirror 46 will produce a first bright spot that will travel across the document. The light will be reflected in amounts determined by the character of the document. The first set of lenses in the first housing will direct this reflected light into a first beam 56 that travels radially inwardly toward the center of the yoke 34. When the yoke 34 has rotated 180°, the second mirror 48 will concentrate the light into a second bright spot that will travel across the document. The second set of lenses 54 in the second housing will then direct the reflected light into a second beam 58 that travels radially inwardly toward the center of the yoke 34.

A mirror support 60 having the configuration of a prism is mounted on the yoke 34 between the two sets of lenses 52 and 54. The lenses direct the beams 56 and 58 of light onto mirror surfaces 62 and 64 on the opposite sides of the support 60. These surfaces 62 and 64 alternately reflect the two beams 56 and 58 of light axially of the yoke 34.

A photo-sensor 66 is mounted in the paths of the light beams 68 reflected from the reflecting surfaces 62 and 64. By way of example, the photo-sensor 66 may be mounted inside of a housing 70 carried by the end of the cradle 18. This will maintain the cradle 18 in a fixed stationary position. If the bearing supporting the end of the yoke 34 includes an enlarged opening in the center thereof, the reflected beams 68 may travel axially of the yoke 34 to the sensor 66 without interruption. As will become apparent, the sensor 66 may be an inexpensive photoelectric cell of any readily available type. For example, sensor 66 may be a silicon photo-cell having a response vs. wavelength characteristics shown as curve 66' in FIGURE 7.

In order to resolve the area being scanned, the fields of view of the lenses 52 and 54 may be restricted to approximately the size of the scan area. However, to further resolve the area, a resolving disc 72 may be mounted on the yoke 34. This disc 72 includes a rectangular aperture 74 which is substantially on the axis of rotation and in line with the reflected beams 68.

The size of aperture 74 optically corresponds to the size of the area to be scanned. Normally, the scanned area has a width substantially identical to the width of the line scanned by the stylus in the printing transducer 38. By way of example, this area may be on the order of 0.010 inch parallel to the axis of the platen 16 and 0.007 inch circumferentially of the platen. The disc 72 is preferably rotated with the yoke 34 whereby the rectangular aperture will always be aligned with the lenses 52 and 54. As a consequence, irrespective of the angular position of the yoke 34, the scan area being resolved by the aperture 74 will always be a rectangle aligned circumferentially of the platen 16.

An optical system 75 is disposed between the disc 72 and the photo-sensor 66 for focusing the light from the aperture 74 onto the sensitive face of the sensor 66. Although a single lens may be employed, it has been found desirable to employ a pair of lenses 76 and 78 that are adjustable. This will be effective to insure the lenses being positioned to accurately focus the light into a small area. The optical system 75 further includes a filter 75 having a transmission characteristics shown as curve 75' in FIGURE 7.

The optical system 75 including the lenses 76 and 78 and filter 77 may be supported inside of the housing 70 whereby the lenses 76 and 78 will not rotate. It may be seen that as the yoke 34 rotates, one or the other of the lenses 52 and 54 will collect the light reflected from the document and direct it onto the aperture 74. The aperture 74 will resolve the scan area and allow only the resolved light to reach the photo-sensor 66. The photo-sensor 66 will then produce an electrical signal that is a function of the reflectivity of the document.

If the area being scanned has a uniform reflectivity such as occurs with an extended black area or an extended white area, the signal from the photo-sensor 66 will have a correspondingly uniform amplitude. In order to amplify a signal having low frequency segments of this nature, it is necessary to employ direct coupled amplifiers. Such amplifiers are inherently unstable and tend to drift over wide ranges. In order to overcome this difficulty, a chopper or shutter wheel 80 may be disposed inside of a housing 79 and driven by a motor 81. The periphery of the wheel 80 is positioned between the lens system 75 and the photo-sensor 66. Preferably, the plane of the wheel 80 passes through the focal point of the lens system 75 and the photo-sensor 66 is disposed immediately behind the wheel 80. This will facilitate gating the light "ON" and "OFF" since it will be a small point.

The periphery of the wheel 80 (see FIGURE 5) includes a plurality of windows 82 separated by intervening opaque segments 84. As the wheel 80 rotates, the alternate transparent windows 82 and opaque segments 84 will disrupt or chop the light reaching the photo-sensor 66. As a consequence, even though the reflected light is of uniform intensity, the signal from the photo-sensor 66 will be of the alternating variety.

The output of the photo-sensor 66 may be interconnected with an amplifier 86. Since the frequency of the signal from the photo-sensor 66 is of the alternating variety, the amplifier 86 may be a relatively simple amplifier employing AC coupling. Such amplifiers can be designed to be inherently very stable and have a very high gain. Accordingly, even though the signal from the photo-sensor 66 may have a relatively small amplitude, it can be amplified to any amplitude necessary. This, in turn, will eliminate the necessity of employing a very sensitive sensor such as an expensive photo-multiplier tube and permit the photo-sensor 66 being a relatively inexpensive photo-electric cell even though such cells have relatively low sensitivities.

The output of the amplifier 86 may be interconnected with a suitable detector 88 for removing the AC carrier that is added by the shutter wheel 80. The signal from the output of the detector 88 will thus be a greatly amplified baseband signal that is substantially identical to the signal from the photo-sensor 66.

To further improve the fidelity of the signal and eliminate noise, a suitable filter 90 may be connected to the output of the detector. The filter 90 may be of the low-pass variety having a cut-off frequency somewhat higher than the maximum frequency of the baseband signal.

The amplified, detected and filtered baseband signal may then be transmitted to a transceiver operating in the receive mode. Although this may be accomplished by any suitable means, a system similar to that disclosed in copending application, Ser. No. 458,954, filed May 26, 1965, in the names of Rex T. Crookshanks and Glenn A. Reese and assigned of record to The Magnavox Company may be employed. This system employs a frequency modulator 92 that modulates a carrier wave with the baseband signal. The resultant signal is preferably in a sufficiently low frequency band to be transmitted over conventional telephone transmission lines presently used for telephonic conversations.

A coupler 94 may be connected to the output of the modulator for coupling the signal onto a transmission line. This coupler 94 may be effective to acoustically or otherwise couple the signal into a conventional telephone for transmission over a conventional telephone line to a receiving unit.

The beams 56 and 58 of light from the two lens systems 52 and 54 are directed onto the reflecting surfaces 62 and 64 of the support or prism 60. Both of the beams 56 and 58 are then reflected longitudinally of the yoke 34 and along the axis of rotation. It should be noted that it is physically impossible for the reflected beams 68 to be coincident and precisely along the axis. As a consequence, it is desirable for the prism 60 to be adjusted so that the beams 68 of light from the two sides 62 and 64 of the prism 60 are as close as possible to the axis of rotation and are symmetrically disposed with respect thereto. One means by which this may be accomplished is to mount the prism 60 on means that will permit the prism 60 being adjusted. In the present instance, the adjusting means include a member 96 having two portions 98 and 100 which are folded at right angles to each other and a pair of adjusting screws 102 and 104.

By adjusting the first screw 102, the portions will be separated and the prism 60 will rotate about an axis substantially parallel to the axes of the two lens systems 52 and 54 and normal to the axis of rotation of the yoke 34. This will cause the beams 56 and 58 of light projected onto the opposite sides of the prism 60 and reflected therefrom to be oriented relative to each other so that the effective phase of the two lens systems 52 and 54 will be modified. This adjustment is made until the two lens systems 52 and 54 are scanning at the document in precisely the same phase relationship as the two printing transducers, more particularly precisely 180° out-of-phase with each other.

Figure 4:
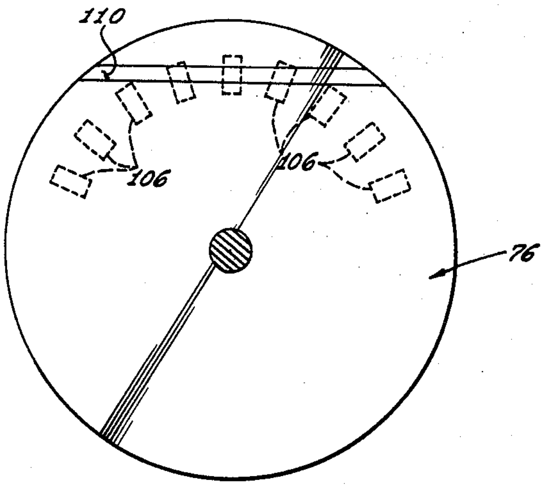
FIGURE 4 is a view, on a greatly enlarged scale, of the face of one of the lenses in an optical portion of the transducer means of FIGURE 2.

By adjusting the second screw 104, the prism 60 is rotated about a line normal to the axes of the lens system 52 and 54 and the axis of rotation of the yoke 34. This form of motion will vary the lines scanned by the lenses. This adjustment is made until the two lens systems 52 and 54 are scanning the document along the same line. When the yoke 34 rotates, the bright spots scan across the document and the two lens systems 52 and 54 focus the reflected light on the aperture 74. The light resolved by the aperture 74 will be incident upon the face of the lens 76 in the form of a bright rectangle 106. As described above, the rectangular beam of light will not travel exactly along the axis of the yoke 34, but will be slightly displaced therefrom. As a consequence, the bright rectangle 106 will follow an arcuate path across the face of the lens similar to that seen in FIGURE 4. If the prism 60 has been properly adjusted, the beams 68 of lights resulting from the different lens systems 52 and 54 will follow identical arcuate paths.

As previously stated, the aperture 74 is rectangular so as to resolve a rectangular area on the document. Also, the disc 72 rotates with the yoke 34 so that the rectangular area always extends circumferentially of the platen 16 and has the same orientation to the lens systems 52 and 54. As as consequence, the orientation of the bright rectangle 106 from the beam 68 will change as the yoke 34 rotates. This, in turn, will cause the bright rectangle 106 on the face of the lens 76 to rotate and turn end for end in FIGURE 4. As can readily be seen, the effective rectangular scanning area moves progressively in the direction of the short dimension. The resolution of the system is defined by the size of the long side of the rectangle, and a contrasting square of the size of the long side of the rectangle is the smallest picture increment resolved. The baseband of the output signal includes therefor as a fundamental a frequency equal to ratio of scanning speed over the size of the long side of the rectangle. This frequency is the highest fundamental of any of the significant data frequencies on the baseband. The rectangle scans in the direction of the short side, tending to increase somewhat the resolution in the scan direction which is of little or no consequence. More important is that the content in harmonics of the above defined fundamental frequency is reduced. If the scanning spot were a square, a black dot of equal size when scanned could result in a triangular output, i.e., the light intensity would decrease about linearly to a minimum peak and increase again. However, the rectangular scanning spot will produce a trapezoidal output for this case, which is a closer approximation of a sine wave than a triangle.

The windows 82 in the periphery of the shutter wheel 80 are also normally rectangular or square and are of sufficient size to just let the beam 68 pass therethrough. As explained above, the rectangular beam 68 will rotate relative to the windows 82 in the aperture wheel 80 as the yoke 34 rotates. When the yoke 34 is in one position, the length of the rectangle is aligned radially of the window 82 as shown in FIGURE *5b*. As can be seen in FIGURE *5b*, this will cause the light to be chopped into substantially rectangular pulses with very rapidly rising and falling leading edges. The average intensity of this chopped light will be of a maximum.

However, when the yoke 34 has rotated 90° from the foregoing position, the rectangular beam 68 will also be rotated 90°. As a consequence, the length of the rectangle will be disposed circumferentially of the windows 82 as seen in FIGURE *5a*. Under these conditions, as seen in FIGURE *6a*, the light will be chopped into pulses having amplitudes that tend to vary substantially as a sawtooth wave. This chopped light will have an average value less than in FIGURE *6b*.

If the light reflected from the document is of substantially uniform intensity, the foregoing effect will cause the chopped light and the signal from the wheel 80 to have an envelope 108 that varies between a maximum and minimum value during each revolution of the yoke 34 as seen in FIGURE *6c*. The resultant amplitude modulation will result in the density of the printing to vary whereby the facsimile copy will have bands of light and dark.

One means of eliminating the foregoing effect is to provide a counter modulation of the light intensity. In the present instance, this is accomplished by an opaque anti-modulation light strip 110 across the face of the lens 76. The opaque anti-modulation strip 110 is positioned to extend over a small portion of the path traversed by the bright rectangle 106. This will reduce the intensity of the light passing through the lenses 76 and 78 when the axis of the rectangle is parallel to the windows 82. This, in turn, will cause the amount of light reaching the shutter wheel 80 to be modulated so as to just compensate for the modulation produced by the variations in the orientation of the light beam 68 relative to the windows 82. Thus, the light will be maintained between the uniform limits 112 irrespective of the area of the document being scanned.

The reason for providing filter 77 shall now be discussed briefly. The filter is actually required (or desired) only because the (inexpensive) incandescent lamp 44 and the (inexpensive) silicon cell 66 have respectively output and input characteristics with maxima in the infrared region (see curves 44' and 66' of FIGURE 7). Hence, a document with red or reddish letters, lines, etc. on white, yellowish or light brown paper will not provide sufficient contrast for the particular transducer system. Red filter 77 now shifts the maximum response of the system into the yellow region so that for the most commonly used types of paper the background will be established as white. Red, blue and green printing will result in input signals of lesser magnitude resulting in a black print out just as if the printing in the document scanned were also black. The particular filter to be employed thus is selected by the requirement to produce a characteristics shown in dashed lines in FIGURE 7. The characteristics shows amplitude of the output of photo-cell 60 vs. wavelength for a lamp with a spectrum characteristic 44' and a filter with a transmission characteristic 77'. Choice of the filter is thus dictated by the choice for elements 44 and 66. A "blue" lamp and/or a more or less predominantly blue sensitive photo detector may obviate the filter to achieve the same objective.

The invention described above has certain important advantages. By using parabolic reflectors 46 and directing the light through lens systems to the photo-sensor 66 and by disposing the photo-sensor 66 on the axis of rotation of the lens system, two diametrically opposed lens systems can be provided where each directs light from the copy to the single photo-sensor 66. This is important in insuring that the signal produced during the rotation of each lens system past the copy is consistent with the signal produced during the rotation of the other lens system past the copy. Furthermore, since the disc 72 rotates, any aberration of the hole in the disc from a truly cylindrical configuration do not produce variations in the light impinging or the photo-sensor 66 as successive instants of time. The reason is that the rotation of the disc 72 causes the hole in the disc to maintain a constant position relative to the position scanned on the copy at successive instants of time.

While only a single embodiment of the present invention is disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. A facsimile unit including the combination of:
- an arcuate retainer disposed on a particular axis for receiving a document to be duplicated and for maintaining the document in a scan position;
- a light source;
- mirror means positioned adjacent the light source for focusing the light into a bright spot on the document to obtain a reflection of the light from the document;
- means for providing a rotation of the mirror means on the particular axis;
- means disposed relative to the light reflected from the document for directing the light along the particular axis;
- a photosensor disposed on the particular axis to provide an electrical signal having characteristics dependent upon the characteristics of the light incident thereon;
- means for modulating the light passing from the directing means to the photosensor; and
- means for operating upon the modulated light to compensate for any variations of the light between maximum and minimum values during the rotation of the mirror, the mirror means comprising a pair of semi-parabolic mirrors providing two focused light spots diametrically opposite relative to the particular axis and the directing means comprising a prism having a pair of reflecting surfaces and means being provided for independently adjusting the position of the mirror means in a first direction relative to the particular axis and in a second direction substantially perpendicular to the first direction and the particular axis.

2. A facsimile unit including the combination of:
- arcuate means disposed of a particular axis for receiving a document to be duplicated and maintaining the document in a scan position;
- a rotor disposed adjacent the retainer and the document positioned thereon;
- a drive motor connected to the rotor for rotating the rotor on the particular axis;
- means for directing light to a position variable on the document in accordance with the rotation of the rotor;
- lens means on said rotor, the lens means being focused on a scan spot that travels across the document as the rotor revolves, said lens means being positioned to focus the light reflected from the document into a beam of light;
- a resolving member mounted on the rotor to revolve therewith, said member including a resolving aperture positioned on the particular axis and having an optical size corresponding to the size of the scan spot so as to form a resolved beam that rotates with the rotor;
- a photosensor disposed on the particular axis to produce an electrical signal having characteristics dependent upon the characteristics of the light incident thereon;
- at least one lens disposed between the aperture and the photosensor to focus the resolved beam of light onto the photosensor;
- a shutter wheel optically positioned between the aperture and the photosensor, said shutter wheel having windows to intermittently disrupt the light reaching the photosensor;
- means for compensating for any variations in the light reaching the photosensor in each revolution of the rotor as a result of the action of the shutter wheel,
- prism means being disposed to receive the light from the lens means and to direct the light through the resolving aperture to the photosensor, and
- means being provided for adjusting the prism means in a first direction transverse to the particular axis and in a second direction substantially perpendicular to the first direction and the particular axis.

3. A unit as set forth in claim 2, including in addition, a light stop disposed on the lens to modify the amount of light in the revolving beam that reaches the photosensor.

4. A facsimile unit for operating in a transmit mode for scanning a document to be duplicated, including the combination of:
- means for positioning the document to be duplicated in an arcuate configuration;
- a pair of optical means positioned for rotation to alternately receive light reflected from a progressing scanning spot on the document during rotation;
- means coupled to the pair of optical means for rotating them about a particular axis;
- photosensor means positioned in substantial alignment with the particular axis and effective to produce signals that are a function of the intensity of the light incident thereon;
- reflecting means positioned on the particular axis for rotating with the optical means and having a pair of reflecting surfaces positioned respectively in line with the optical means, said surfaces being positioned to reflect light received by the optical means onto the photosensor means; and
- means for pivotally adjusting the reflecting means about a first axis transverse to the particular axis and about a second axis perpendicular to the first axis and the particular axis to provide for the passage of light along the particular axis to the photosensor means.

5. A facsimile unit for operating in a transmit mode for scanning a document to be duplicated, including the combination of:
- a retainer having a cylindrical surface for receiving the document and maintaining the document in a cylindrical scan position;
- a rotor disposed adjacent to the retainer and to the document thereon, said rotor being positioned to revolve around the axis of the cylindrical surface;

a drive motor interconnected with the rotor for rotatably driving the rotor;

a pair of first lens means on said rotor, said lens means having their optical axes disposed normal to the axis of said rotor and positioned to alternately scan the document on the retainer as said rotor revolves;

photosensor means effective to produce signals that are a function of the intensity of the light incident thereon, said photosensor being disposed in substantial alignment with the axis of rotation;

means defining a pair of reflecting surfaces and being disposed on the rotor in alignment with the axis of rotation, the reflecting surfaces being respectively positioned in line with the lens means to reflect the light substantially axially of the rotor;

second lens means disposed between the reflecting surfaces and the photosensor for projecting the light from the reflecting surfaces onto the photosensor; and means for adjusting the reflecting surfaces relative to the axes of the lens means and of the rotor to provide for a passage of the light from the reflecting surfaces through the second lens means to the photosensor means.

6. A facsimile unit including the combination of:

a source of light;

means for receiving a document to be duplicated and maintaining the document in an arcuate scan position;

optical means focused on a scan spot on the document;

means providing revolving motion on a particular axis of rotation of the optical means relative to the means for receiving, so that the scan spot travels across the document, said optical means being positioned to focus the light from the source into a beam of light and to direct the beam of light to the receiving means for reflection by the document on the receiving means in accordance with the characteristics of the document;

prism means disposed on the axis of rotation of the optical means to receive the light reflected by the document;

means for adjusting the prism means in a pair of transverse directions to provide for the direction of light along the axis of rotation of the optical means;

a resolving member having a resolving aperture that is positioned in said beam and has an optical size corresponding to the size of the scan spot, the resolving aperture being disposed on the particular axis of rotation; and a photosensor disposed on the axis of rotation of the optical means to produce an electrical signal having characteristics dependent upon the characteristics of the light incident thereon, said photosensor being aligned with said aperture and the beam of light passing therethrough.

7. A facsimile unit including the combination of:

a source of light;

arcuate means for receiving a document to be duplicated and maintaining the document in an arcuate scan position;

a rotor disposed adjacent the arcuate receiving means and the document positioned thereon for rotation on a particular axis to reflect the light from the source to the document and to focus the light so reflected;

driving means coupled to the rotor for rotating the same;

a pair of lens means on the diametrically opposite sides of said rotor and focused on a scan spot on the document that travels across the document as the rotor rotates, each said lens means being effective respectively to focus into beams of light the light reflected alternatingly from the document towards one and the other of the pair of lens means;

means positioned in line with the lens means for directing the beams of light into an essentially common optical path along the particular axis of rotation;

means defining a resolving aperture disposed on the particular axis of rotation and having an optical size corresponding to the size of the scan spot and positioned in said optical path;

means for independently adjusting the means for directing in a first direction transverse to the particular axis and in a second direction transverse to the first direction to provide for a direction of the light from the prism means along the particular axis through the resolving aperture to the photosensor; and a photosensor disposed on the particular axis of rotation to produce an electrical signal having characteristics dependent upon the characteristics of the light incident thereon, said photosensor being aligned with said aperture and the light passing therethrough.

8. A unit as set forth in claim 7, the means for directing comprising a prism with a pair of reflecting surfaces, the prism being coupled to the rotor for rotation therewith and oriented to respectively direct the beams into said common optical path.

9. A facsimile unit for operating in a transmit mode including the combination of:

an arcuate member having a surface for receiving a document to be duplicated and maintaining the document in a scan position;

a support member disposed adjacent the first member and effective to rotate on a particular axis relative to the surface;

optical means on the support member including a light source for directing a beam of light towards the document, and further including means responsive to light reflected from a particular spot on the document for directing the reflected light as a beam in a particular optical path;

prism means disposed at the particular axis and responsive to the beam of light in the particular optical path for directing the beam along the particular axis;

means cooperatively disposed relative to the prism means for adjusting the position of the prism means in a first direction transverse to the particular axis and in a second direction substantially perpendicular to the particular axis;

a drive motor interconnected with the support member for rotating the support member on the particular axis relative to the arcuate member, so that the particular spot provides a scanning path across the document; and a photosensor means on the particular axis in the optical path to produce electrical signals in response to the light directed in the optical path, the optical means and the photosensor having characteristics so that the electrical signals have maximum amplitube for reflected yellow light as directed in the optical path and lesser amplitude for blue and red light.

10. The unit as set forth in claim 9, there being a red filter in the optical path, the light source having maximum emissivity for waves longer than yellow light.

11. A facsimile unit for operating in a transmit mode for scanning a document to be duplicated, comprising:

first means for positioning a document in a cylindrical configuration having a particular axis;

means for directing a beam of light toward a spot on the document for reflection by the document;

second means positioned to receive light reflected from the spot on the document;

third means responsive to the light received by the second means and directing it into a particular optical path transverse to the particular axis;

fourth means for providing relative motion of the second, third and fourth means relative to the first means about the particular axis;

prism means responsive to the light in the particular optical path for directing the light along the particular axis;

means operatively coupled to the prism means for adjusting the position of the prism means in a first direction transverse to the particular axis and in a second direction substantially perpendicular to the first direction and the particular axis;

photocell means disposed on the particular axis for receiving the light directed by the prism means; and fifth means included in the second and third means for defining a rectangular scanning spot moving across the surface of the document in a direction colinear with the smaller dimension of the rectangle.

References Cited

UNITED STATES PATENTS

| | | | |
|---|---|---|---|
| 2,209,719 | 7/1940 | Rustad | 178—7.1 |
| 2,800,527 | 7/1957 | Artzt | 178—7.1 |
| 2,394,649 | 2/1946 | Young | 178—7.1 |
| 3,142,224 | 7/1964 | Andrews et al. | 88—24 |

OTHER REFERENCES

RCA, Radio Facsimile, vol. I, 1938, pp. 148–153 and 230–239.

ROBERT L. GRIFFIN, Primary Examiner

R. L. RICHARDSON, Assistant Examiner

U.S. Cl. X.R.

178—7.1